March 23, 1971  W. L. BAKER  3,572,294
COW CONTROLLER

Filed April 5, 1968  3 Sheets-Sheet 1

INVENTOR
WALLACE LEE BAKER

March 23, 1971   W. L. BAKER   3,572,294
COW CONTROLLER

Filed April 5, 1968   3 Sheets-Sheet 2

INVENTOR
WALLACE LEE BAKER

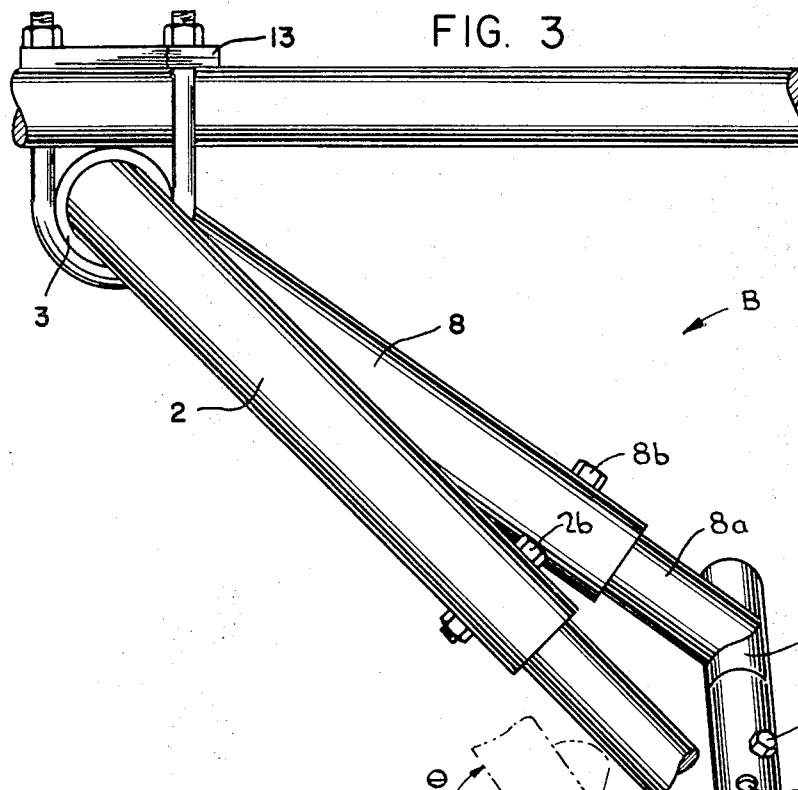
FIG. 3
FIG. 4
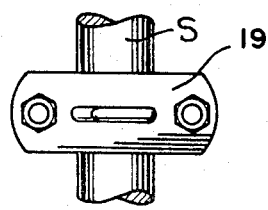
FIG. 4a
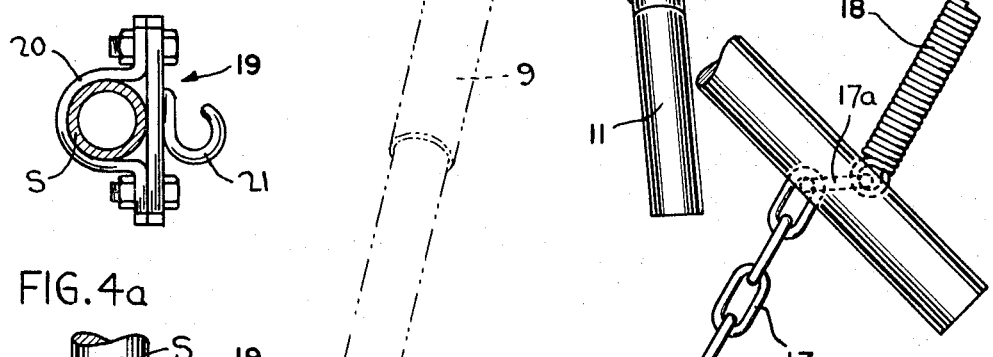
INVENTOR
WALLACE LEE BAKER

United States Patent Office 3,572,294
Patented Mar. 23, 1971

3,572,294
COW CONTROLLER
Wallace L. Baker, Rte. 3, Box 9, Burley, Idaho 83318
Filed Apr. 5, 1968, Ser. No. 719,175
Int. Cl. A01j *1/00, 3/00*
U.S. Cl. 119—27            7 Claims

ABSTRACT OF THE DISCLOSURE

A device wherein positive pressure is applied in the sway of the back of an animal to prevent arching of the back to thereby prevent kicking and sidewise movement of the animal. The pressure bar is curved so as to fit the contour of the back but with a special straight portion to effectively engage the backbone. A spring is utilized to normally retain the pressure bar in an inoperative position and an opposed chain is used for adjustable holddown whereby the device can be quickly engaged and disengaged. The pressure bar assembly is positioned at an angle to the animal in the operative position to prevent overcenter travel and resultant loss of positive pressure. Adjustments are provided to make rough adjustments for different size animals.

---

The present invention relates to arrangements for restraining the movement of animals, and more particularly, to a device for controlling the movement of large animals, such as cows, so as to prevent them from kicking and swaying from side to side.

In modern day dairy operations, it is imperative for a farm to be capable of handling a large number of cows in a minimum amount of space so as to be capable of taking full advantage of modern milking equipment. Heretofore, the milking operation with machines has been slowed by the operator having to spend time calming each cow as the milking machine is placed in operation on her. To explain, even the most cooperative cows are sometimes annoyed by the use of milking machines, especially as the udder is being washed and teat cups are being applied by the operator. When thus annoyed, the cow's natural reaction is to obstruct the operator and to attempt to remove the cups by raising her hind foot and kicking forwardly along the side where the operator and the milk transfer tubes are positioned. Furthermore, in any herd of cows there are always a few which are naturally temperamental or nervous and thus hard to control during their confinement in a stall for milking. In such a case, the cow will resist even more violently by attempting to turn and kick the operator directly or to sway to the side pinning the operator against the side of the stall. In these situations it would be desirable to have a means to positively but gently control the cow's movements during milking to allow the operator to move more quickly and, as an additional benefit, to allow inexperienced persons or small children to help without fear of being injured by the cow.

Thus, it is one object of the present invention to provide an apparatus for positively restraining kicking and sidewise movement of large animals such as cows.

It is another object of the present invention to provide such a controlling arrangement for animals that does not cause pain or great discomfort to the animal and thus minimizes the tendency of the animal to resist or fight back.

It is another object of the present invention to provide a controlling device of the type described which can be quickly and easily engaged and disengaged so as to maximize the efficiency of the operation.

To briefly describe the apparatus of the present invention, a bar is positioned in the sway of the back of a cow, for example, with sufficient pressure to prevent the animal from raising her hind foot to kick or to resist being washed or milked. This pressure bar is generally curved to fit the outline of the cow's back to apply a substantially even and thus gentling pressure across the full width thereof. The bar is mounted for bodily pivotal movement about a horizontal axis for rapid movement toward and away from the back of the animal so that said bar can be quickly engaged and disengaged by the operator. To keep the pressure bar normally out of the way so that the cow may be moved into and out of the stall without obstruction, means is provided for normally urging the bar upwardly away from the animal to an inoperative position in the top of the stall. A holddown means is provided in opposition to the spring to fix the bar in position to apply firm, nonresilient pressure to the animal whereby the bar resists upward movement of the back of the animal but does not follow downwardly as the cow relaxes, thus assuring the desired gentling effect. In the preferred embodiment, this holddown means comprises a chain which is attached to a fixed hook so that by engaging a selected link of the chain the required adjustment of the bar to apply just the right amount of pressure can be easily made.

The concave or curved shape of the bar has a centrally located flat portion so as to insure in all instances engagement of the bar with the backbone of the animal. It has been found that since the back is covered only by skin in this area, pressure which is applied by this flat portion will insure sufficient discomfort to the cow to discourage raising her back, and thus kicking, while the pressure bar is in operative position. This flat portion thus assures that a minimum amount of pressure is needed to control any given animal, which in turn means that the animal will more likely learn not to resist the pressure and will behave more readily.

Depending side extensions are provided on the pressure bar to prevent side-to-side swaying of the cow and are important for safety to prevent the cow from shifting position and attempting to force the operator against the side of the stall. Also, in the popular diagonal stall with which the device may be used, the cow is kept in check from shifting laterally of the stall and thus being able to back out of the rear gate when it has been opened in readiness for the next cow to enter for milking.

The pressure bar is capable of rough adjustment to accommodate different sizes and breeds of animals by providing means to adjust the length of the depending support arms for the pressure bar as well as means to adjust the angular relationship with the horizontal mounting bar. By properly coordinating these two adjustments, the curved pressure bar may be maintained in a plane substantially perpendicular to the back of the animal for maximum effectiveness through evenness of pressure. Further, with this feature the support arms for the bar may be made to extend at an acute angle to the back of the animal to prevent the possibility of overtravel of the bar and to assure that the necessary quick adjustment travel is available. The control arm can be adjusted in length to provide varying leverage and the ends of the pressure bar are capable of adjustable extension as required to best suit different animals. These adjustments also insure that the device of the invention is completely portable and can be easily adapted to any type of stall or stanchion construction for animals. Furthermore, the pressure bar assembly of the present invention is fabricated from conventional steel tubing so as to provide ruggedness but also to allow inexpensive manufacture.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 3 is a side view of the pressure bar assembly and mounting hardware of FIG. 2;

FIG. 4 is a detailed side view of the preferred type hook assembly to be utilized to connect the spring and chain operators of the device; and FIG. 4a is a plan view of the hook assembly of FIG. 4.

Figure 1:
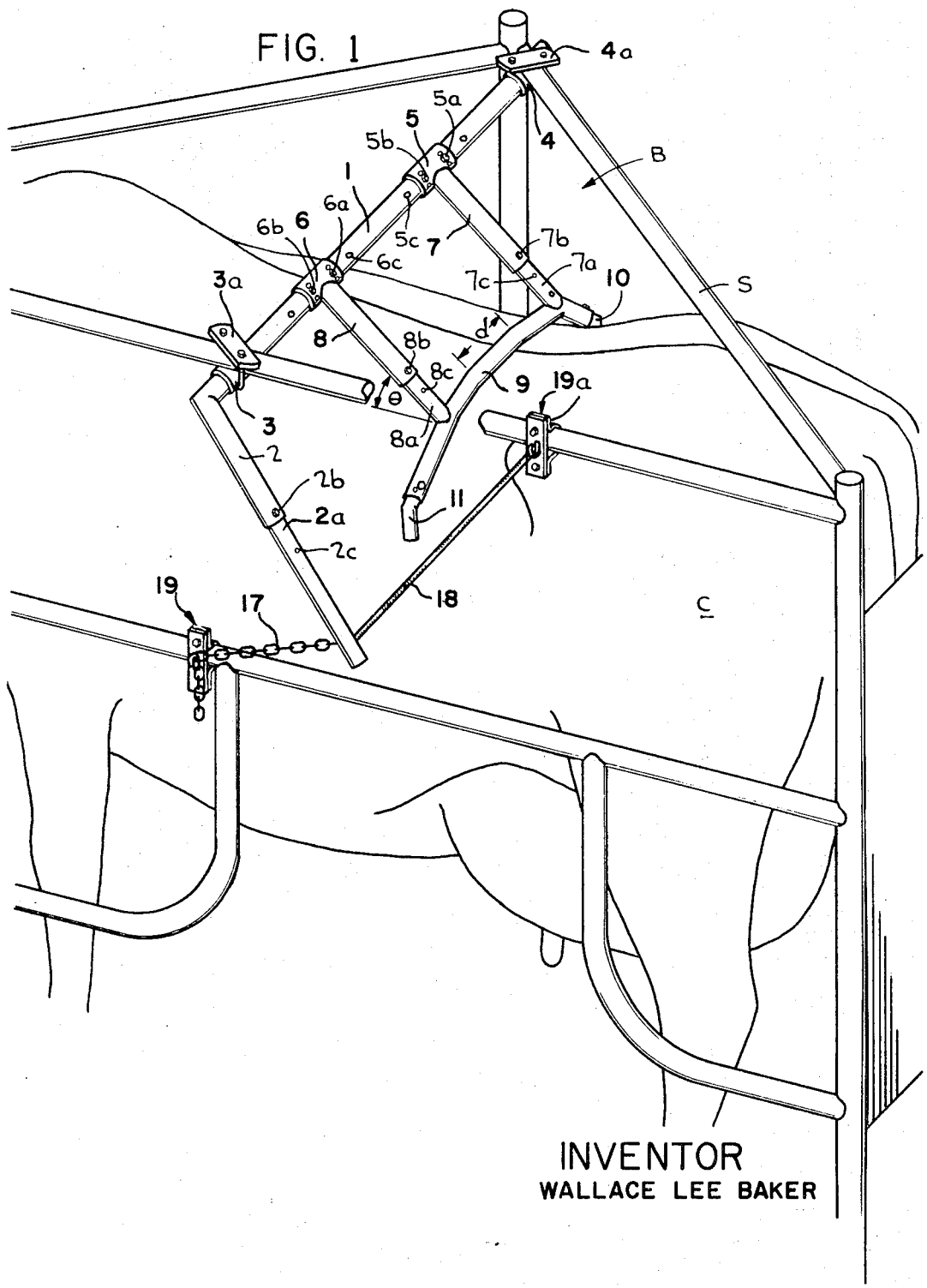
FIG. 1 is a perspective view of an animal controlling device constructed in accordance with the present invention and mounted in an exemplary working environment.
Figure 2:
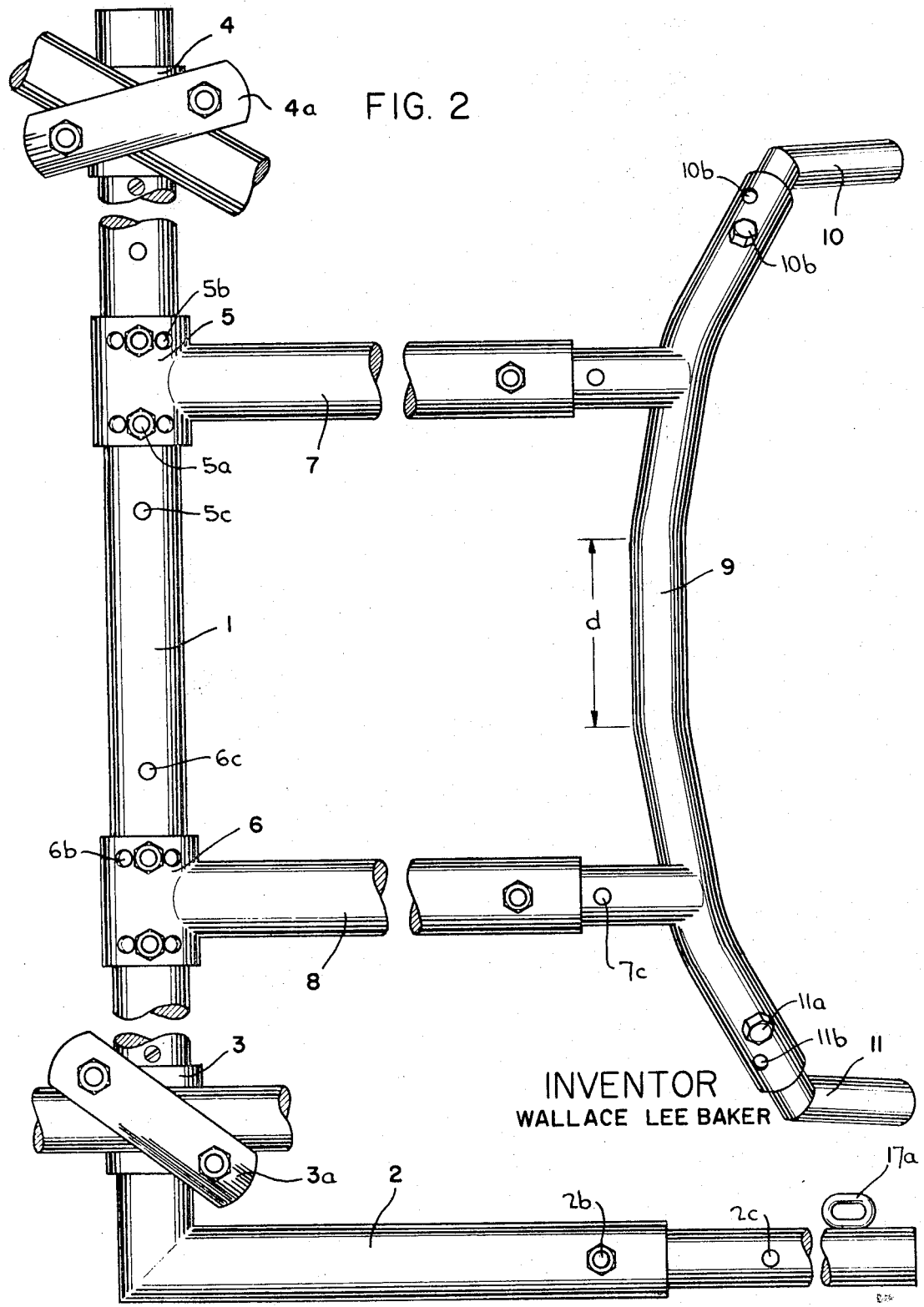
FIG. 2 is a detailed top view of the pressure bar assembly and mounting hardware.

Referring now to FIGS. 1 and 2, a more complete description of the preferred embodiment of the present invention can be given. Thus, a pressure bar assembly B has been shown in FIG. 1 as being mounted on a conventional stall structure S in which is positioned a cow C in operative relationship thereto. It should be pointed out that while the pressure bar assembly B of the present invention is particularly adapted for such a use to control cows during the milking operation for example, other uses, such as in controlling horses or the like, are well within the purview of the present invention.

As shown, the pressure bar assembly B comprises a pivotal cross bar 1 mounted along a horizontal axis with a depending control arm 2 at one end thereof positioned so as to extend outside the confines of the stall S. The control arm 2 includes an extension 2a which is adjustable to vary the operating leverage obtainable through the use of a bolt 2b which can be positioned in any one of a plurality of apertures 2c. The cross bar 1 is rotatably mounted for its pivotal movement by means of a pair of sleeves 3, 4 which are, in turn, fastened to the upper horizontal members of the stall S by suitable U-bolt clamps 3a, 4a, respectively.

Positioned inboard of the sleeves 3, 4 on the support bar 1 is an additional pair of sleeves 5, 6 which are fixedly secured thereto for angular as well as lateral adjustable movement by means of bolts 5a, 6a and a plurality of apertures 5b, 6b and 5c, 6c, respectively (see FIG. 2). Suitably welded to these sleeves 5, 6 and positioned so as to depend downwardly therefrom (see FIGS. 1 and 3) is a pair of support arms 7, 8 which receive in a telescopic manner, a pair of extensions 7a, 8a. A curved pressure bar 9 is carried by said extensions 7a, 8a in the desired manner so as to engage the cow C in the sway of her back as shown in FIG. 1 and the operation of which will be explained in detail later. Adjustment of the length of the extensions 7a, 8a is conveniently gained through use of bolts 7b, 8b and a plurality of apertures 7c, 8c, as shown.

The pressure bar 9 is constructed so as to generally conform to the curve of the back of the cow C and includes a pair of extension members 10, 11 at the ends thereof for insuring engagement well down on the side of said cow C, as shown in FIG. 1. Each of these extension members 10, 11 is adjustably held in position by corresponding bolt 10a, 11a and selected aperture 10b, 11b (see FIG. 2) to insure proper fit for the particular size cow C.

As best shown in FIG. 3, the curved pressure bar 9 is fixed to the extensions 7a, 8a at an acute angle $\phi$ so that when the pressure bar 9 is moved to the operative position (dotted line position of FIG. 3) the bar 9 will be in a plane perpendicular to the back of the cow C. This arrangement further insures the proper fit of the cow C within the pressure bar 9 so that maximum controlling effectiveness can be gained.

An important feature of the shape of the bar 9 is the provision of a flat or noncurved length or portion $d$ in the center.

As shown in FIG. 1, this portion $d$ is thus arranged so as to be disposed directly over the backbone of the cow. This flat portion $d$ thus insures that the backbone is engaged by the pressure bar 9 regardless of the particular shape of the back of the cow C and is effective to apply the pressure and discomfort to the cow C that will prevent her from raising the back the slight amount required for her to lift the hind leg for kicking. In other words, this flat portion will in all cases insure engagement between the bar 9 and the cow C at this critical point even if other portions of the pressure bar 9 do not exactly fit the contour of the back of the particular cow C being restrained due to the differences in shape that exist between animals.

The positioning of the pressure bar B is controlled through the control arm 2 by a chain holddown 17 which is fixed to the free end of the extension 2a by a suitable link 17a welded thereto, as best shown in FIG. 2. Opposed to the direction of force to be applied to the chain 17 is a tension spring 18 which may also conveniently be connected to the link 17a, as shown in FIG. 3. The opposite ends of the chain 17 and the spring 18 are suitably attached to specially constructed lower and upper hook assemblies, generally designated by the reference numeral 19, 19a, respectively, and which will now be described.

The hook assemblies 19, 19a are identical and thus can be interchangeably used for connecting both the chain 17 and the spring 18 to the stall S. The universal hook assembly 19, 19a includes a U clamp 20 and a curved hook member 21 welded to one side thereof, as shown in FIGS. 4 and 4a. For the attachment of the spring 18, the hook member 21 of the assembly 19a is positioned so as to open upwardly, whereas with use of the chain 17, the hook assembly 19 is positioned upsidedown so that the hook member 21 opens downwardly. In this manner effective attachment is provided with a savings in cost of manufacture through interchangeability of parts.

In operation of the device of the invention, when the chain 17 is not attached to the lower hook assembly 19, the spring 18 is effective to hold the pressure bar assembly B up in the out-of-the-way position, as best shown by the full line showing of FIG. 3. It is assumed that the rough adjustments described above have been previously made to best suit the breed of cow being milked in the stall S. During the adjusting operation special attention should be given to seeing that the pressure bar assembly in the operative position extends at an acute angle $\phi$ to the back of the cow C (see FIGS. 1 and 3) so that there can be no over center movement of the pressure bar assembly B, i.e., through the vertical plane that includes the pivot axis, which condition would result in loss of effective control. Thus, the cow C may be moved into the stall S through the rear door and positioned as required for milking.

The operator then brings the pressure bar 9 down into firm engagement in the sway of the back of the cow C (note FIG. 1) by simply grasping the control arm 2 and moving the same downwardly against the force of the spring 18. When the desired pressure has been obtained the link of the chain 17 adjacent the lower hook assembly 19 is hooked over the hook member 21 to fixedly secure the bar 9 in this position. It has been found that after the operator has used the device of the invention a few times, he can feel or sense just the right amount of pressure to be applied to the cow C to prevent her from effectively arching her back and thus being able to move a foot from the floor for kicking or otherwise obstructing the preparation for milking.

As explained above, while the device is in the operative position because the bar 9 extends down the sides of the cow C, there is also restraint of moving from side to side for further safety. This latter feature also means that as the milking operation proceeds the rear door of the stall may be opened in readiness for bringing the next cow into position without fear of the cow C being milked at that time being able to shift position and back out of the stall S. When the milking operation has been completed the pressure bar assembly B is capable of being quickly released to return under influence of the spring 18 to the full line inoperative position of FIG. 3, by simply removing the chain 17 from the attaching member 19.

From the foregoing the favorable results and advantages of the controlling device of the present invention should be readily apparent to those skilled in the art. The pressure bar 9 is fixed into position with firm pressure against the back of the cow so that she is positively restrained from action which would obstruct the operator's access. The spring 18 is sufficiently strong to hold the chain 17 under constant tension to prevent any possibility of the chain 17 becoming loose prematurely as a result of movement of the cow C. Also of importance is the fact that the arrangement is such as to cause no pain to the cow C and does not follow her movements when she relaxes and allows her back to move down. Because of this gentling action there is no tendency to fight or reject the device of the invention. The simplicity of the construction and the ease with which it can be operated are valuable assets in modern dairy operations where a large number of devices and fast operation of the devices is essential to allow maximum number of cows to be handled.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. An animal restraining device comprising a pressure bar, means for pivotally mounting said bar for adjustable movement about a substantially horizontal axis toward and away from the back of said animal, means for normally urging said bar away from said animal, and holddown means for fixing said bar in an adjusted position to apply firm pressure to the animal whereby the upward movement of the back of said animal is positively restrained, said mounting means including a cross bar extending along said horizontal axis, a pair of depending arms extending from said cross bar for supporting said pressure bar, and means for adjusting the length of said depending arms whereby said pressure bar may be roughly adjusted for different sized animals.

2. The combination of claim 1 wherein is further provided means for adjusting the angular relationship between said cross bar and said depending arms whereby the angle at which said arms are directed toward said animal can be adjusted.

3. An animal restraining device comprising a pressure bar, means for pivotally mounting said bar for adjustable movement about a substantially horizontal axis toward and away from the back of said animal, and holddown means for fixing said bar in an adjusted position to apply firm pressure to the animal whereby the upward movement of the back of said animal is positively restrained, said pressure bar being shaped so as to curve around the back of said animal and apply substantially equal pressure along the full length thereof when in the operative position, said pressure bar further including end extensions directed generally toward the ground for engaging along the sides of said animal to prevent sidewise movement, said pressure bar further including a centrally located extended flat portion to positively bear on the backbone of said animal when in the operative position.

4. An animal restraining device comprising a pressure bar, means for pivotally mounting said bar for adjustable movement about a substantially horizontal axis toward and away from the back of said animal, means for normally urging said bar away from said animal, and holddown means for fixing said bar in an adjusted position to apply firm pressure to the animal whereby the upward movement of the back of said animal is positively restrained, said mounting means comprising a cross bar extending along said horizontal axis and having a depending control arm at one end thereof, and said urging means comprising a tension spring connected to the end of said control arm for urging said pressure bar upwardly away from the back of said animal, and said holddown means comprising a chain fixed adjacent said end of said control arm in opposed relationship to said tension spring, and fixed means for attaching a selected link of the free end of said chain whereby said pressure bar may be adjustably positioned to thereby vary the operative pressure applied to the back of said cow.

5. An animal restraining device comprising a pressure bar assembly including a substantially rigid cross bar, depending support arm means and a substantially horizontal pressure bar, means for pivotally mounting said cross bar adjacent its ends for adjustable movement of said pressure bar assembly toward and away from said animal, adjustable means for fixing said cross bar in position to cause said pressure bar to apply firm pressure to the back of said animal while maintaining said pressure bar assembly at an acute angle with respect thereto, whereby the upward movement of the back of said animal is positively restrained.

6. The combination of claim 5 wherein said pressure bar is curved so as to substantially fit the back of said animal and is attached to said support arm at an angle so as to extend in a plane substantially perpendicular to the back of said animal, whereby said pressure bar applies substantially equal pressure across the full width of the back of said animal.

7. The combination of claim 6 wherein is further provided spring means for normally urging said bar away from the back of said animal whereby said pressure bar assembly will be retained above the animal in an out-of-the-way position when not in use.

References Cited

UNITED STATES PATENTS

| 1,062,119 | 5/1913 | Root | 119—27 |
| 1,194,046 | 8/1916 | Luttrell | 119—99 |
| 2,660,982 | 12/1953 | Linton | 119—98 |

HUGH R. CHAMBLEE, Primary Examiner

U.S. Cl. X.R.

119—98